(12) United States Patent
Jelaca et al.

(10) Patent No.: US 9,232,596 B2
(45) Date of Patent: Jan. 5, 2016

(54) MAINS SYNCHRONIZED PWM DIMMING

(71) Applicant: Dialog Semiconductor GmbH, Kirchheim/Teck-Nabern (DE)

(72) Inventors: Nebojsa Jelaca, Graz (AT); Stefan Zudrell-Koch, Hohenems (AT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/644,449

(22) Filed: Mar. 11, 2015

(65) Prior Publication Data

US 2015/0264769 A1 Sep. 17, 2015

(30) Foreign Application Priority Data

Mar. 13, 2014 (EP) ..................................... 14159329

(51) Int. Cl.
*H05B 33/08* (2006.01)
*H05B 41/28* (2006.01)

(52) U.S. Cl.
CPC ........ *H05B 33/0845* (2013.01); *H05B 33/0815* (2013.01); *H05B 41/28* (2013.01)

(58) Field of Classification Search
USPC ............... 315/247, 185 S, 224, 291, 307–326
See application file for complete search history.

(56) References Cited

U.S. PATENT DOCUMENTS

| | | |
|---|---|---|
| 2006/0214603 A1 | 9/2006 | Oh et al. |
| 2010/0164406 A1 | 7/2010 | Kost et al. |
| 2012/0112638 A1 | 5/2012 | Melanson et al. |
| 2012/0293087 A1 | 11/2012 | Matsuda et al. |
| 2013/0099694 A1 | 4/2013 | Naruo et al. |
| 2013/0221862 A1 | 8/2013 | Knoedgen |
| 2014/0055052 A1 | 2/2014 | Zudrell-Koch et al. |

OTHER PUBLICATIONS

European Search Report 14159329.3-1802, Oct. 17, 2014, Dialog Semiconductor GmbH.

*Primary Examiner* — Tuyet Vo
(74) *Attorney, Agent, or Firm* — Saile Ackerman LLC; Stephen B. Ackerman

(57) ABSTRACT

Driver circuits which reduce or remove flicker of solid state lighting SSL devices, notably at relatively low dimming levels are presented. The driver circuit comprises a power converter to transfer energy from an input of the driver circuit to the SSL device. The energy at the input is derived from an AC mains voltage at a mains frequency. A controller determines a dim level for the SSL device. and operates the power converter continuously in a first operation mode for supplying energy to the SSL device at a first energy level, if the dim level is above a pre-determined dim level threshold. The controller operates the power converter in the first operation mode at a time duration of PWM pulses, and operates the power converter in a second operation mode at a time duration in-between the PWM pulses, if the dim level is below the pre-determined dim level threshold.

28 Claims, 7 Drawing Sheets

MAINS SYNCHRONIZED PWM DIMMING

TECHNICAL FIELD

The present document relates to driver circuits for solid state lighting (SSL) devices. In particular, the present document relates to driver circuits which are configured to reduce or remove flicker of SSL devices, notably at relatively low dimming levels.

BACKGROUND

Solid State Lighting (SSL) light bulb assemblies, e.g. Light Emitting Diode (LED) based light bulb assemblies, are expected to replace GLS (General Lighting Service) or incandescent lamps. SSL devices typically comprise a driver circuit and/or power converter in order to convert electric power from a mains supply to electric power suitable for an SSL light source comprised within the SSL device (e.g. an array of LEDs).

The driver circuit for an SSL device should be configured to convert the AC mains voltage into a possibly constant load voltage and a load current. Furthermore, driver circuits should be configured to drive an SSL device at different dimming levels.

SUMMARY

The present document addresses the above mentioned technical problem of SSL devices and describes an efficient method and system for driving a SSL device without a visible flicker. In particular, the driver circuits should be configured to control the load voltage (also referred to as the drive voltage) and the load current (also referred to as the SSL current) such that the SSL device does not flicker in a manner which is visible to the human eye. The emitted light of the SSL device should not exhibit any visible flicker, even at relatively low dimming levels.

According to an aspect, a controller for a driver circuit of a solid state lighting (SSL) device is described. The SSL device may comprise one or more light emitting diodes (LEDs). The driver circuit comprises a power converter configured to transfer energy from an input of the driver circuit to the SSL device. The power converter may comprise an isolating or a non-isolating power converter. Alternatively or in addition, the power converter may comprise a linear regulator. The power converter may comprise an inductor (e.g. a transformer) configured to store energy from the input of the driver circuit and release the stored energy towards the SSL device. Furthermore, the power converter may comprise a power switch which is arranged in series with the inductor and which is configured to enable an inductor current through the inductor, when the power switch is in on-state. In particular, the power switch (which may comprise e.g. a metal oxide semiconductor, MOS, transistor) may be put into on-state to store energy within the inductor, and the power switch may be put into off-state to release the energy towards the SSL device. By way of example, the power converter may comprise a fly-back power converter.

The energy at the input of the driver circuit may be derived from the AC mains voltage at a mains frequency. In particular, the input voltage of the power converter may be derived from a rectified version of the AC (alternating current) mains voltage (also referred to as the rectified input voltage). The input voltage may vary in accordance to a cycle frequency (which may be twice the frequency of the mains voltage, i.e. the cycle frequency may be twice the mains frequency). The mains frequency may correspond to 50 Hz or 60 Hz. The AC mains voltage may exhibit or may have a waveform comprising a sequence of full-waves. The full-waves may be repeated within the waveform at the mains frequency. Each full-wave may be subdivided into two-half waves.

The controller may be configured to determine a dim level for the SSL device. The dim level may be derived based on information comprised within the waveform of the AC mains voltage (e.g. based on a modulation of the waveform and/or based on a phase-cut angle). Alternatively or in addition, the dim level may be determined based on information which has been received on a separate communication channel (e.g. via Bluetooth or via Wireless LAN).

The controller may be configured to perform analog dimming, if the dim level is above a pre-determined dim level threshold. For this purpose, the controller may be configured to operate the power converter continuously in a first operation mode for supplying energy to the SSL device at a first energy level, if the dim level is above a pre-determined dim level threshold. The first energy level of energy may be sufficiently high such that the SSL device emits visible light. The first operation mode may also be referred to as a linear operation mode.

For operating the power converter in the first operation mode, the controller may be configured to repeatedly put the power switch to on-state, subject to detecting freewheeling of the inductor, and to put the power switch to off-state, subject to detecting that the inductor current has reached a pre-determined peak current. During the first operation mode, the power switch of the power converter may be commutated between the on-state and the off-state at a commutation cycle rate. The commutation cycle rate may be in the range of 100 kHz. The pre-determined peak current may be dependent on the dim level. In particular, the pre-determined peak current may be increased, if the dim level increases (and vice versa). As such, the power converter may be operated in a boundary conduction mode (BCM), when in the first operation mode. The first operation mode may be such that the SSL device is provided with a substantially constant SSL current, thereby emitting light at a substantially constant illumination level. The first operation mode may be beneficial for providing flicker-free light at relatively high dim levels, i.e. at relatively high illumination levels.

The controller is configured to perform PWM dimming. For this purpose, the controller is configured to operate the power converter in the first operation mode within a sequence of PWM pulses at a PWM frequency, and to operate the power converter in a second operation mode in between the PWM pulses, if the dim level is below the pre-determined dim level threshold. In other words, the controller may be configured to operate the power converter in the first operation mode at time instants or at a time duration of PWM pulses, and operate the power converter in the second operation mode at time instants or at a time duration in-between the PWM pulses. In the second operation mode, the power converter is operated for supplying energy to the SSL device at a second energy level. The second energy level of energy is lower than the first energy level of energy. In particular, the second energy level of energy may be such that the SSL device does not emit visible light. The second operation mode may be a maintenance mode during which energy is provided to the controller. For PWM dimming, the power converter may alternate between the first operation mode and the second operation mode. The relative duration of the first operation mode (relative to the second operation mode) may be controlled by the width and/or the PWM frequency of the PWM pulses.

The sequence of PWM pulses typically comprises PWM pulses at the PWM frequency. The PWM pulses may have a constant pulse width or pulse duration (if the dim level remains unchanged). The sequence of PWM pulses or the pulses may be synchronized with the AC mains voltage. In other words, the PWM pulses may occur for the same portions of the half-waves or full-waves of the AC mains voltage. By doing this, it is ensured that the energy which is available at the input of the driver circuit for the different PWM pulses remains unchanged from one half-wave to the next half-wave and/or from one full-wave to the next full-wave. This ensures that the energy which is provided to the SSL device within the different PWM pulses also remains unchanged. Consequently, a flicker-free operation of the SSL device is ensured, also for relatively low dim levels (i.e. for relatively low illumination levels of the SSL device).

By alternating the first operation mode and the second operation mode at the PWM frequency, the SSL device may be operated to generate light pulses at the PWM frequency. The PWM frequency may be sufficiently high (e.g. 100 Hz or higher) to ensure that the light pulses are not visible to a human eye. By doing this, the average illumination level may be further reduced, i.e. relatively low dim levels may be implemented.

It should be noted that the PWM frequency of the PWM pulses differs from the above mentioned communication cycle rate of the power switch. The PWM frequency defines the repetition rate of the PWM pulses, wherein the power converter is operated in the first operation mode during the PWM pulses. In other words, during the PWM pulses which occur at the PWM frequency, the power switch of the power converter may be switched between the on-state and the off-state at the commutation cycle rate. Consequently, the PWM frequency is typically substantially lower (in the range of 100 Hz) than the commutation cycle rate (in the range of 100 kHz).

The controller may be configured to determine a sequence of synchronization pulses based on the rectified AC mains voltage. For this purpose, the rectified AC mains voltage (also referred to herein as the rectified input voltage) may be compared with a pre-determined voltage threshold. Furthermore, the controller may be configured to determine the sequence of PWM pulses based on the sequence of synchronization pulses. The PWM pulses may be determined such that their relative position with regards to the synchronization pulses remains unchanged from one half-wave to the next or from one full-wave to the next.

In particular, the controller may be configured to determine a single synchronization pulse per full-wave. This may be beneficial due to the fact that the waveform of the AC mains voltage may exhibit asymmetries within a full-wave. On the other hand, the mains frequency of the AC mains voltage is typically maintained in a relatively precise manner. By determining only a single synchronization pulse per full-wave, such inter-wave asymmetries may be eliminated. The controller may be configured to determine at least one PWM pulse per half-wave (based on the single synchronization pulse per full-wave). This ensures that the PWM frequency is sufficiently high to avoid a flicker of the SSL device. In particular, this allows the PWM frequency to be greater than a perceptual frequency of light intensity variations perceivable by a human eye.

As indicated above, the AC mains voltage may exhibit a waveform comprising a sequence of full-waves. A so called phase of a full-wave may be associated with an amplitude of the full-wave. In other words, the full-wave may comprise different phases along the time line of the full-wave. The controller may be configured to determine the sequence of PWM pulses such that the PWM pulses coincide with the same one or more phases of each full-wave of the sequence of full-waves. By doing this, it is ensured that for corresponding PWM pulses of different full-waves, the energy at the input of the driver circuit remains unchanged. This ensures a flicker-free operation of the SSL device.

As indicated above, a full-wave typically comprises two half-waves. The sequence of PWM pulses may comprise an integer number of PWM pulses per half-wave. In other words, the PWM frequency may be an integer multiple of the cycle frequency. As a result of this, synchronicity between the AC mains voltage and the sequence of PWM pulses may be achieved.

The integer number of PWM pulses may be centered at a zenith of the half-wave (e.g. at the highest amplitude of the half-wave). As a result of this, the energy intake during the PWM pulses may be maximized, which may be beneficial for a flicker-free operation of the SSL device.

The controller may be configured to determine a type of dimmer that is used to set the dim level. Furthermore, the controller may be configured to synchronize the sequence of PWM pulses with the AC mains voltage, in dependence of the determined type of dimmer. In particular, the phase of a full-wave of the AC mains voltage at which a PWM pulse is placed may depend on the type of dimmer. By doing this, it can be ensured that energy intake from the input of the driver circuit during a PWM pulse is ensured (even in case of phase-cut dimmers).

A width of the PWM pulses may depend on the dim level. In other words, the width of the PWM pulses may be modified when the dim level changes. In particular, the width of the PWM pulses may be reduced, if the dim level is reduced (and vice versa). Furthermore, the width of the PWM pulses may depend on the PWM frequency. Typically the width of the PWM pulses is reduced if the PWM frequency is increased (and vice versa).

For operating the power converter in the second operation mode, the controller may be configured to periodically put the power switch to on-state for a pre-determined on-duration, and to put the power switch to off-state for a pre-determined off-duration. On-states and off-states may alternate. The on-duration and the off-duration may be such that the transferred energy at the second energy level is sufficient for maintaining the controller in operation. On the other hand, the transferred energy at the second energy level may be insufficient for causing the SSL device to emit visible light. As such, the second operation mode may be used to ensure a continuous operation of the driver circuit, even at low dim levels.

The controller may be configured to put the power switch to off-state, upon entry into the second operation mode (and coming from the first operation mode). Furthermore, the power switch may be maintained in off-state, until the time instant when freewheeling of the inductor is detected. By doing this, it is ensured that the first operation mode (and the illumination of the SSL device) is terminated at a defined time instant, and that the SSL device is operated in a flicker-free manner.

The controller may be configured to put the power switch to or maintain the power switch in off-state, upon entry into the first operation mode (and coming from the second operation mode). Furthermore, the controller may be configured to maintain the power switch in off-state for at least a pre-determined recovery duration starting from a last on-state period of the power switch (which typically occurred when the power converter was operated in the second operation mode). By doing this, it is ensured that the first operation mode starts in a defined state of the power converter, and that the SSL device is operated in a flicker-free manner.

According to a further aspect, a driver circuit for an SSL device is described. The driver circuit comprises a power converter. Furthermore, the driver circuit comprises a controller. The controller may comprise any of the features described in the present document.

According to a further aspect, a light bulb assembly is described. The light bulb assembly comprises an electrical connection module configured to electrically connect to a mains power supply, thereby providing an input voltage. Furthermore, the light bulb assembly comprises a driver circuit as described in the present document, configured to convert an input voltage into a drive signal for a solid state lighting (SSL) device. In addition, the light bulb assembly comprises the SSL device configured to provide light in accordance to the drive signal.

According to another aspect, a method for operating a controller and/or a driver circuit as outlined in the present document is described. The method may comprise steps which correspond to the features of the controller and/or driver circuit described in the present document. In particular, the method may be directed at operating a solid state lighting (SSL) device using a driver circuit. The driver circuit comprises a power converter configured to transfer energy from an input of the driver circuit to the SSL device. The energy at the input may be derived from an AC mains voltage at a mains frequency.

The method comprises determining a dim level for the SSL device. Furthermore, the method may comprise operating the power converter continuously in a first operation mode for supplying energy to the SSL device at a first energy level, if the dim level is above a pre-determined dim level threshold. The method comprises operating the power converter in the first operation mode within a sequence of PWM pulses at a PWM frequency, and operating the power converter in a second operation mode in between the PWM pulses, if the dim level is below the pre-determined dim level threshold. In the second operation mode the power converter is operated for supplying energy to the SSL device at a second energy level. The second energy level is typically lower than the first energy level. The sequence of PWM pulses is synchronized with the AC mains voltage.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

In the present document, a light bulb "assembly" includes all of the components required to replace a traditional incandescent filament-based light bulb, notably light bulbs for connection to the standard electricity supply. In British English (and in the present document), this electricity supply is referred to as "mains" electricity, while in US English, this supply is typically referred to as power line. Other terms include AC power, line power, domestic power and grid power. It is to be understood that these terms are readily interchangeable, and carry the same meaning.

Typically, in Europe electricity is supplied at 230-240 VAC, at 50 Hz and in North America at 110-120 VAC at 60 Hz. The principles set out in the present document apply to any suitable electricity supply, including the mains/power line mentioned, and a rectified AC power supply.

Figure 1:
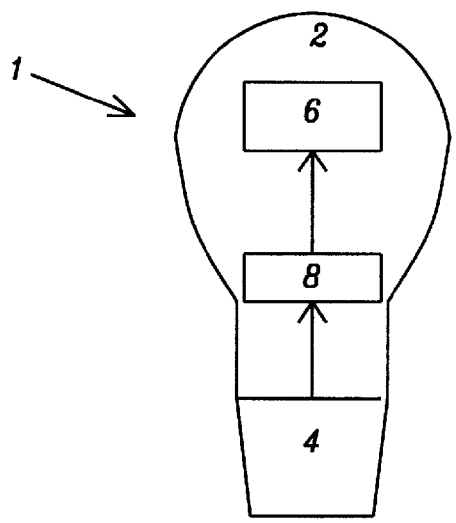
FIG. 1 illustrates a block diagram of an example light bulb assembly.

FIG. 1 is a schematic view of a light bulb assembly. The assembly 1 comprises a bulb housing 2 and an electrical connection module 4. The electrical connection module 4 can be of a screw type or of a bayonet type, or of any other suitable connection to a light bulb socket. Typical examples for an electrical connection module 4 are the E11, E14 and E27 screw types of Europe and the E12, E17 and E26 screw types of North America. Furthermore, a light source 6 (also referred to as a SSL device) is provided within the housing 2. Examples for such light sources 6 are a solid state light source or SSL device 6, such as a light emitting diode (LED) or an organic light emitting diode (OLED). The light source 6 may be provided by a single light emitting device, or by a plurality of LEDs. Typical SSL devices 6 comprise a plurality of LEDs arranged in series, such that the on-voltage $V_{on}$ of the SSL device results from the sum of on-voltages of the individual LEDs. Typical values for on-voltages of SSL devices are in the range of 100V-150V.

Usually, the voltage drop across an SSL device 6 remains substantially constant (at the on-voltage $V_{on}$ of the SSL device 6), regardless the intensity of the light emitted by the SSL device 6. The intensity of the light emitted by the SSL device 6 is typically controlled by the drive current through the SSL device 6.

Driver circuit 8 is located within the bulb housing 2, and serves to convert supply electricity (i.e. the mains supply)

received through the electrical connection module 4 into a controlled drive voltage and drive current for the light source 6. In the case of a solid state light source 6, the driver circuit 8 is configured to provide a controlled direct drive current to the light source 6.

The housing 2 provides a suitably robust enclosure for the light source and drive components, and includes optical elements that may be required for providing the desired output light from the assembly. The housing 2 may also provide a heat-sink capability, since management of the temperature of the light source may be important in maximising light output and light source life. Accordingly, the housing is typically designed to enable heat generated by the light source to be conducted away from the light source, and out of the assembly as a whole.

Figure 2A:
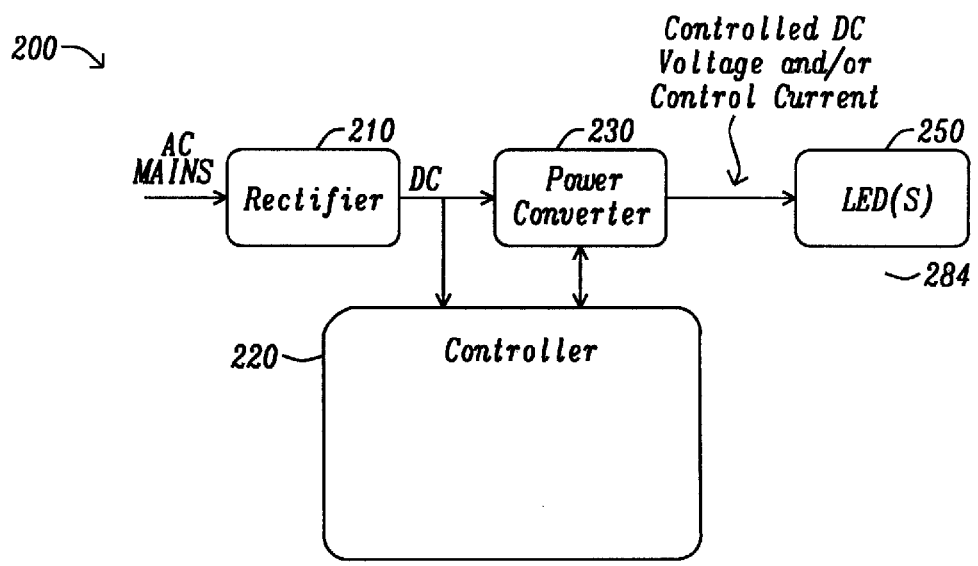
FIG. 2a shows a block diagram of example components of a driver circuit for a SSL device.

FIG. 2a illustrates example components of a driver circuit shown in FIG. 1 (8), and in FIG. 2a (200) of an SSL device 6, 250. The driver circuit 200 comprises a rectifier 210 which receives alternating current (AC) supply electricity from the mains supply, and delivers a rectified current (DC) at its output. This DC power is received by a power converter 230 which serves to output a controlled DC drive voltage and/or a controlled drive current to the SSL device 250. The voltage and current characteristics of the drive signal (comprising the drive voltage and the drive current) are determined by the type and number of LEDs employed in the light source 6 (i.e. in the SSL device 250). The power supplied to the SSL device 250 is controlled in dependence upon desired operating conditions of the SSL device 250. In one example, the SSL device 250 includes a plurality of LEDs connected in series, and requires a drive signal having a drive voltage of 50V or more. In general, the drive voltage may be in the range of 10V to over 100V depending on the number of LEDs comprised within the SSL device 250.

The driver circuit 200 may further comprise a controller 220 configured to control the power converter 230 to generate an appropriate drive signal (i.e. an appropriate drive voltage and an appropriate drive current) as a function of the rectified mains voltage. In particular, the controller 220 may be configured to adapt a voltage conversion ratio of the power converter 230 based on the rectified (but varying) voltage provided by the rectifier 210. Furthermore, the controller 220 may be configured to control the power converter 230 to provide an appropriate drive current to the SSL device 250, thereby controlling the intensity of the light emitted by the SSL device 250.

The power converter 230 may comprise an inductive energy storage device (e.g. an inductor or a transformer) and a switch device. The switch device (also referred to as a power switch) may be controlled by the controller 220, and may be provided by a metal oxide semiconductor field effect transistor (MOSFET) device, or other device suitable for switching high voltage (for example, tens of volts). It should be noted, however, that the controller 220 may comprise the switch device itself, thereby directly controlling the provisioning of an appropriate drive voltage for the SSL device 250. The power converter 230 may comprise different circuit topology. For example, the power converter 230 may comprise a buck converter circuit, a boost converter circuit, a buck/boost converter circuit, a SEPIC (single-ended primary-inductor converter) circuit, and/or a fly-back converter circuit.

Figure 2B:
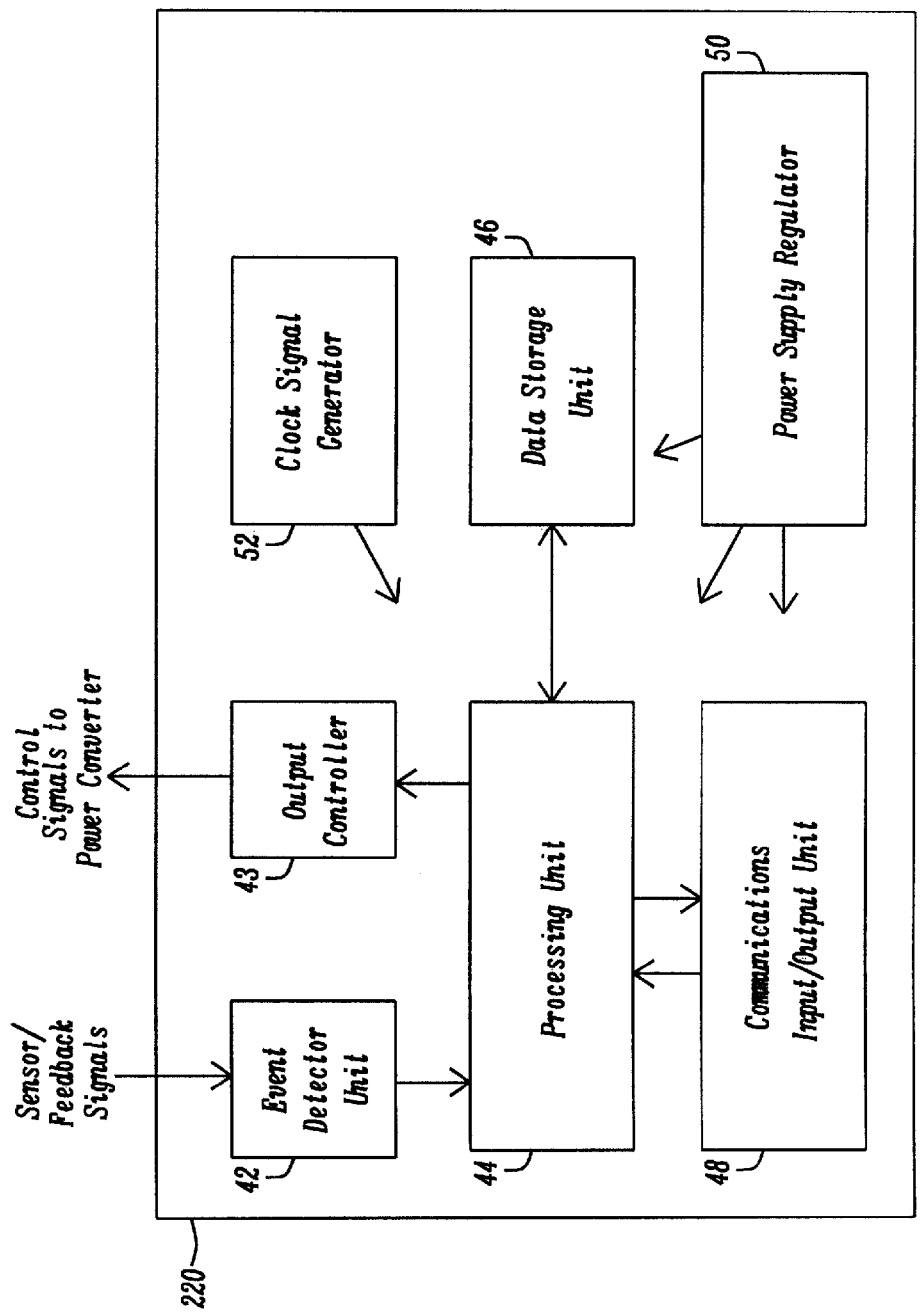
FIG. 2b shows a block diagram of example components of the controller of a driver circuit.

FIG. 2b illustrates an example block diagram of a controller 220. The controller 220 includes an event detector unit 42 connected for receiving sensor/feedback signals S (e.g. for receiving the rectified voltage provided by the rectifier 210), an output controller 43 for outputting control signals C (e.g. to the power converter 230), a processing unit 44 for overall control of the system, and a data storage unit 46 for storing data for use by the processing device. A communications input/output unit 48 may be provided for enabling the processing unit 44 to communicate with other devices, for example using a suitable wired or wireless communications protocol. The controller 220 also incorporates a power supply regulator 50, which supplies power to the devices within the controller 220, and a clock signal generator 52 (such as an oscillator circuit) for supplying a reference clock signal to the processing unit 44. The clock signal generator 52 may be configured to generate a clock signal from the sensor/feedback signals S (e.g. from the rectified voltage provided by the rectifier 210), thereby enabling a synchronization of the driver circuit 200 with the mains frequency. In other words, the clock signal generator 52 may make use of the periodicity of the mains cycle, in order to synchronize the driver circuit 200 with the mains cycle.

The processing unit 44 operates to generate the control signals C for controlling the switch device or devices in the power converter 230. Typically, the control signals are pulse-width modulated (PWM) signals that control the duty cycle (that is, the ratio of the length of an 'on-state' of the power switch over the length of a complete commutation cycle comprising an on-state phase and a succeeding off-state phase) of the switch device in the power converter 230, and hence to control the output drive voltage. In an embodiment, the controller 220 is implemented as a microcontroller or as an integrated circuit.

Figure 3:
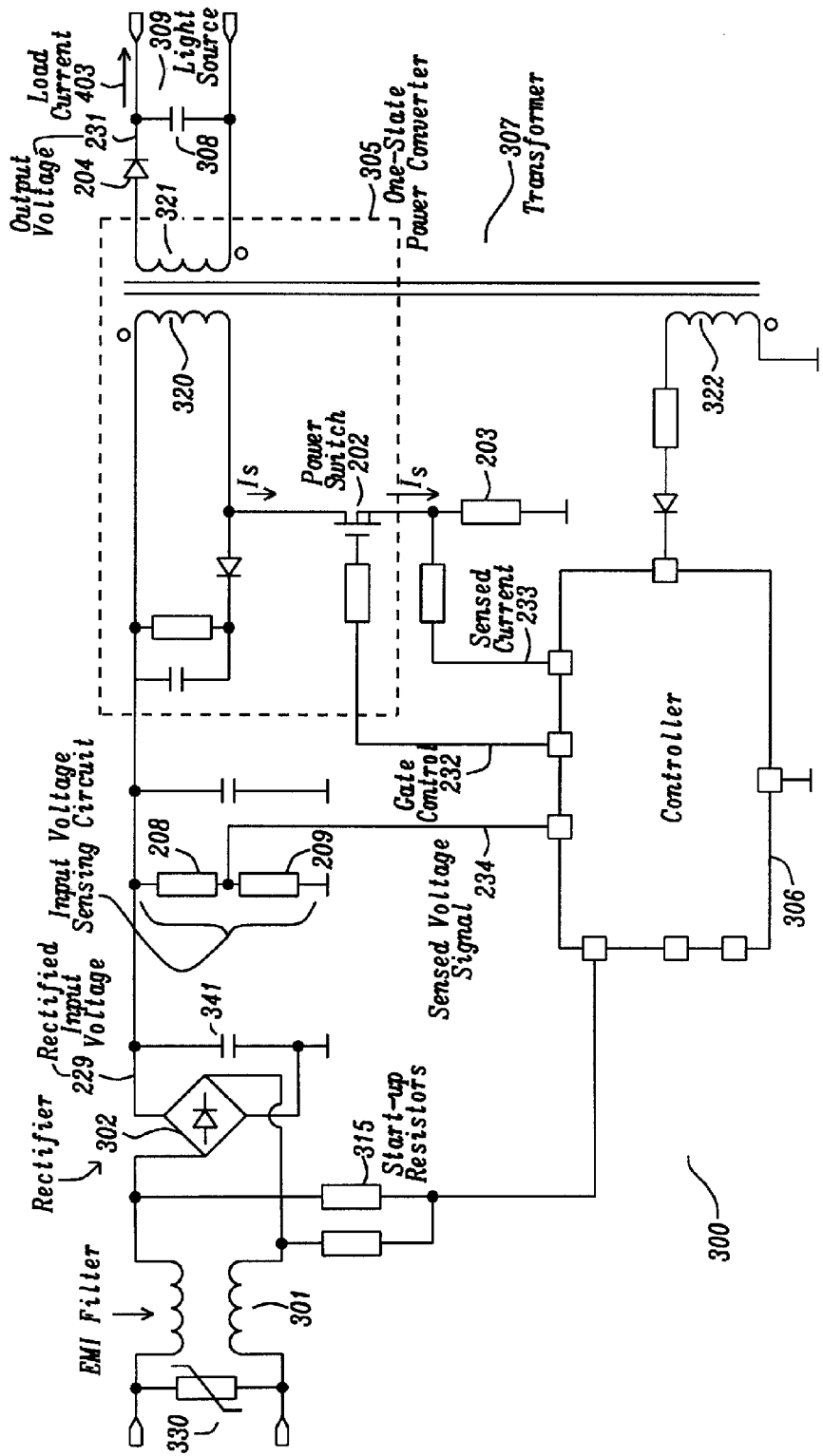
FIG. 3 illustrates a circuit diagram of an example driver circuit for a SSL device.

FIG. 3 shows a circuit diagram of an example driver circuit 300, 200, 8 of a light bulb assembly 1. The driver circuit 300 may be used to provide electrical power to a load 309, 250, 6 (which may e.g. be a light emitting diode, LED, or an LED array). The driver circuit 300 comprises an electromagnetic interference (EMI) filter unit 301 and a rectifier 302, 210, in order to generate a rectified input voltage 229 from the mains supply 330 at the capacitor 341. Furthermore, the driver circuit 300 comprises a controller 306 which is configured to control a power converter of the driver circuit 300. The controller 306 may comprise the controller 220 described above. The controller 306 may be started using one or more start-up resistors 315. Furthermore, the controller 306 may be coupled to a supply voltage capacitor (not shown) configured to provide the supply voltage Vcc to the controller 306 (which may be implemented e.g. as an integrated circuit, IC). In the illustrated example, the driver circuit 300 comprises a one-stage power converter 305 comprising a fly-back converter 305. It should be noted, however, that the driver circuit 300 may comprise a multi-stage power converter. Furthermore, it should be noted that the power converter 305 may comprise other types of converters, notably isolated or non-isolated converters. The fly-back converter 305 of FIG. 3 comprises a transformer 307 having a primary coil 320 and a secondary coil 321, and having an additional auxiliary coil 322, e.g. for measurement purposes. The auxiliary coil 322 may be used to provide information to the controller 306 regarding the output voltage 231 (also referred to as the drive voltage) of the driver circuit 300. Furthermore, the driver circuit 300 may comprise an output capacitor (or storage capacitor) 308 which stores the electrical power to be provided to the light source 309. The fly-back converter 305 comprises a diode 204 which is configured to prevent a reverse energy flow from the output of the fly-back converter 305 to the input of the fly-back converter 305 during an off-state of the switch 202 of the fly-back converter 305.

The input voltage to the power converter 305 corresponds to the rectified input voltage 229. The input voltage 229 may be sensed using input voltage sensing means 208, 209, thereby providing the sensed voltage signal 234 to the controller 306. In the illustrated example, the input voltage sensing means 208, 209 are implemented using a voltage divider comprising the resistors 208, 209. Furthermore, a sensed current signal 233 is determined using current sensing means 203, and is provided to the controller 306. The sensed current signal 233 is indicative of the current through the power switch 202 of the fly-back converter 305 or of the inductor current through the primary winding 320 of the transformer 307. In the illustrated example, the current sensing means are implemented using a shunt resistor 203 which is arranged in series with the power switch 202.

The controller 306 may be configured to determine a gate control signal 232 for putting the switch 202 of the second converter stage 305 into off-state once the current Is through the switch 202 reaches a pre-determined peak current Ip. The gate control signal 232 may be determined based on the sensed current signal 233 and/or based on a freewheeling signal which may be provided e.g. by the auxiliary winding 322 of the transformer 307. In particular, the gate control signal 232 may be set to put the power switch 202 into off-state, once the sensed current signal 233 has reached a pre-determined threshold value (which is typically dependent on the pre-determined peak current Ip). Furthermore, the gate control signal 232 may be set to put the power switch 202 into on-state, once freewheeling of the primary winding 320 of the fly-back converter 305 has been detected.

The driver circuit 300 may be configured to provide a load current or SSL current 403 to the SSL device 309 for generating flicker-free light. Furthermore, the driver circuit 300 may be configured to cover a high power factor and harmonic distortion. This should also be achieved in case of dimming of the SSL device, i.e. in cases when the dimming level of the SSL device is modified.

The level of the illumination which is emitted by the SSL device 309 may be modified by modifying the average current through the SSL device 309. The average current through the SSL device 309 may be modified in an analog manner, where the level of a substantially continuous current 403 through the SSL device 309 is modified. This may be referred to as analog or linear dimming. Alternatively or in addition, the average current through the SSL device 309 may be modified by providing a pulse width modulated (PWM), substantially discontinuous, current 403 to the SSL device 309. The latter is referred to as PWM dimming. In PWM dimming, the level of the SSL current 403 is typically based on the pulse width and period of a PWM signal, while in analog dimming the level of the SSL current 403 is based on the amplitude of an analog signal.

The dim level of an SSL device 309 may be set using a dimmer within the mains supply network. The dimmer may comprise a phase-cut dimmer and/or a digital dimmer. The driver circuit 300 may be configured to determine the dim level based on the waveform of the rectified input voltage 229. Alternatively or in addition, the dim level may be communicated to the driver circuit 300 using a dedicated communication path (e.g. via Bluetooth or Wireless LAN). The driver circuit 300 may be configured to control the power converter 305 based on the dim level. In particular, the driver circuit 300 may be configured to generate a pulse width modulated SSL current 403 for reducing the average level of the SSL current 403 and for reducing the dim level of the SSL device 309.

A possible way for operating the SSL device 309 in an intermittent manner may be to generate the pulse width modulated SSL current 403 based on the reference clock signal of the clock signal generator 52 in FIG. 2b, of the controller 306, 220. A duty cycle of the pulse width modulated SSL current 403 may be used to define the dim level of the SSL device 309. This may be disadvantageous because in case of a single-stage power converter 305 with PFC (Power Factor Control) function, the rectified AC mains voltage 229 is fed directly to the input of the converter stage 305. As a result of this, the input voltage 229 of the power converter 305 corresponds to a half wave AC signal 229. As the reference clock signal is typically asynchronous with regards to the mains voltage 330, this leads to a situation that the pulse width modulated SSL current 403 may be determined based on different phases of the rectified AC mains voltage 229. Such a phase shift leads to an arbitrary change of the amount of energy which is transferred to the SSL device 309. The arbitrary change of the amount of energy which is provided to the SSL device 309 may lead to a visible flicker effect.

The present document describes a method and a corresponding controller 306, 220 which are configured to eliminate such interference between the input voltage 229 (i.e. between the rectified AC mains voltage 229) at the input of the power converter 305 and the pulse width modulated SSL current 403 which is provided to the SSL device 309. In particular, it is proposed to synchronize the generation of the pulse width modulated SSL current 403 with the mains frequency. As a result of this, the energy transfer remains constant across different cycles of the mains supply 330. By doing this, a flicker effect of the SSL device 309 may be avoided. Furthermore, the PWM frequency may be reduced, e.g. down to the mains frequency or to the cycle frequency. This results in a more stable light, especially at relatively low dim levels.

Furthermore, the present document describes a method for performing a gating function on the gate of the power converter 202 for generating the pulse width modulated SSL current 403 and for providing energy to the driver circuit 300 (notably to the controller 306) for operating the driver circuit 300.

As indicated above, the light level of the SSL device 309 may be set depending on the PWM pulse width (e.g. the duty cycle) of the pulse width modulated SSL current 403 through the SSL device 309. In the present document, it is proposed to synchronize the start of PWM operation with the phase of the mains supply 330. The PWM frequency of the PWM pulses of the pulse width modulated SSL current 403 may be derived based on the mains supply 330. In particular, the PWM frequency may be derived from the mains frequency by a multiplication factor, i.e. the PWM frequency may be proportional to the mains frequency or to the cycle frequency, wherein the proportionality factor may be an integer.

For controlling the PWM operation of the SSL device 309, a PWM control signal may be used. The PWM control signal may comprise a sequence of PWM pulses, wherein a PWM pulse indicates a time interval during which a pulse of the SSL current 403 is to be generated by the driver circuit 300. As indicated above, the PWM frequency of the PWM pulses may be derived from the mains frequency or from the cycle frequency. The width of the PWM pulses may be used to control the dim level of the SSL device 309.

The PWM signal may be used to perform a gating function to the fly-back gate drive signal 232 (also referred to as the gate control signal 232). The starting point of the PWM gating may be asynchronous to the fly-back gate drive signal 232, but may be limited to the maximum allowed frequency. After the PWM signal goes low, the fly-back gate drive 232 may be switched off and may wait for zero cross before the driver circuit 300 starts with a pre-determined maintenance cycle for supplying energy for the operation of the driver circuit 300. By synchronizing the PWM signal with the cycles of the mains supply 300, flickering of the SSL device 309 may be avoided, notably at low dim levels.

As indicated above, the average forward SSL current determines the brightness of the SSL device 309. The average SSL current can be dimmed using two approaches: The use of a linear dimming method by changing the average SSL current 403 directly and the use of PWM dimming by switching the SSL current 403 on and off at a relatively high PWM frequency, thereby reducing the average SSL current 403. The PWM frequency of the PWM control signal should be high enough in order to avoid visible flicker, which the human eye can detect.

Figure 4:
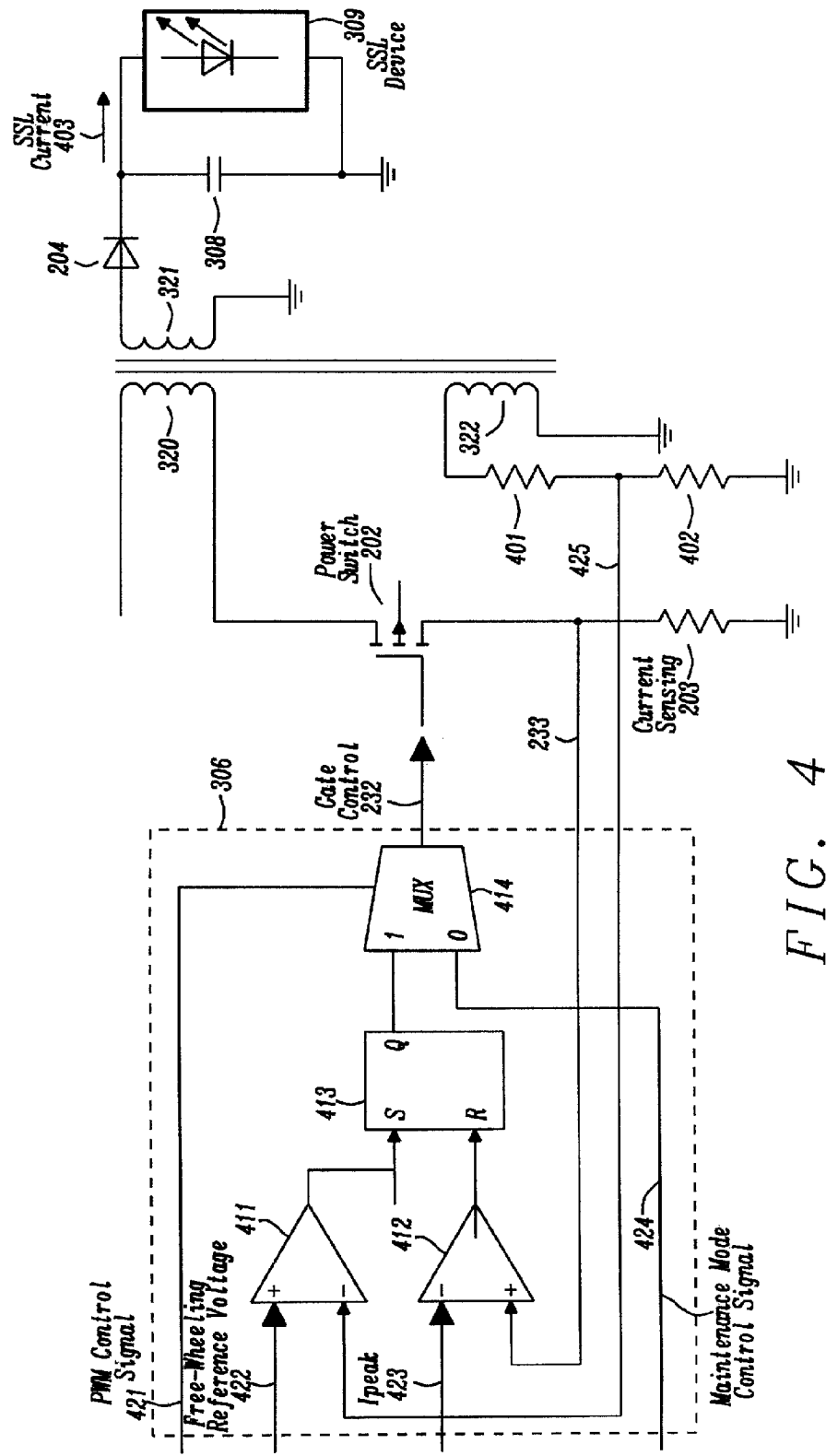
FIG. 4 shows a block diagram of example components of the driver circuit for a SSL device.

FIG. 4 illustrates an example dimming control concept. In particular, FIG. 4 shows excerpts of the driver circuit 300 and of the controller 306, which may be used to control the illumination level of the SSL device 309. The driver circuit 300 comprises freewheeling detection means 401, 402, 322 configured to detect a time instant at which the primary winding 320 of the transformer 307 is energy free. In the illustrated example, the freewheeling detection means comprise a voltage divider 401, 402 configured to provide an indication 425 of the voltage level at the auxiliary winding 322. The indication 425 of the voltage level at the auxiliary winding 322 may be referred to as a freewheeling indication 425. The indication 425 of the voltage level at the auxiliary winding 322 is compared to a freewheeling reference voltage 422 using a first comparator 411. In the illustrated example, the output of the first comparator 411 is coupled with the Set input of an SR latch 413, wherein the gate control signal 232 is derived based on the Q output of the SR latch 413. As a result of this, the gate control signal 232 may be set to high level in order to close the power switch 202 (i.e. in order to put the power switch 202 in on-state).

Furthermore, the driver circuit 300 comprises current sensing means 203 (comprising e.g. a shunt resistor) providing an indication 233 of the current through the power switch (also referred to as the switch current or the inductor current). The indication 233 of the switch current is provided to a second comparator 412, where the indication 233 is compared to a peak current voltage 423. The peak current voltage 423 is indicative of a pre-determined peak current through the power switch 202. The pre-determined peak current typically depends on the dim level. The output of the second comparator 412 is coupled to the Reset input of the SR latch 413. As a result of this, the gate control signal 232 may be set to low level in order to open the power switch 202 (i.e. to put the power switch 202 to off-state).

Hence, the provision of an SSL current 403 to the SSL device 309 may be regulated based on the freewheeling indication 425 and based on the indication 233 regarding the inductor current. In particular, the power switch 202 of the power converter in FIG. 3 (305) may be controlled such that the power switch 202 is opened, when the inductor current reaches a pre-determined peak current, and/or such that the power switch 202 is closed, when the stored energy within the primary winding 320 of the transformer 307 has been completely transferred towards the SSL device 309. The illumination level of the SSL device 309 may be modified by modifying the peak current, i.e. by modifying the peak current voltage 423. This may be used to provide the so called analog or linear dimming of the SSL device 309.

When reducing the dim level below a pre-determined dim level threshold, the peak current falls below a pre-determined peak current threshold. This may lead to a situation, where the SSL current 403 and/or the drive voltage 231 may not be sufficiently high anymore to ensure a reliable illumination of the SSL device 309. The driver circuit in FIG. 3 (300) may therefore be configured to provide PWM dimming for dim levels which would otherwise lead to a peak current which falls below the pre-determined peak current threshold. In other words, the driver circuit 300 may be configured to operate the SSL device 309 using analog or linear dimming for dim levels which are at or above the pre-determined dim level threshold (and which make use of a peak current which is at or above the pre-determined peak current threshold). Furthermore, the driver circuit 300 may be configured to operate the SSL device 309 using PWM dimming for dim levels which are below the pre-determined dim level threshold). The peak current may then be fixed to a pre-determined value which is at or above the pre-determined peak current threshold. By doing this, it is ensured that energy at a first energy level is transferred towards the output of the power converter 305, i.e. towards the SSL device 309. In particular, it may be ensured that sufficient energy is transferred such the SSL device 309 emits light during the PWM pulses. During the PWM pulses, the SSL current 403 may be at a first current level.

The PWM dimming mode may be controlled using the PWM control signal 421. The PWM control signal 421 may control a multiplexer 414 such that if the PWM control signal 421 is at a first level (e.g. at a high level), the power converter 305 is regulated using the indications 233 and 425 (as outlined above). As a result of this, an illumination pulse is generated by the SSL device 309. This operation mode of the power converter 305 may be referred to as a linear operation mode (or as a first operation mode).

On the other hand, if the PWM control signal 421 is at a second level (e.g. at a low level), the power converter 305 may be controlled such that energy at a second energy level is transferred to the output of the power converter 305. The second energy level may be lower than the first energy level. The second energy level may be such that the SSL device 309 does not emit any light. In particular, the power converter 305 may be operated such that the power converter 305 provides energy at the second energy level, which is sufficient for operating the driver circuit 300, notably for operating the controller 306, but which is not sufficient for causing the SSL device 309 to emit visible light. This operation mode may be referred to as the maintenance mode (or as the second operation mode). The maintenance mode may be performed in dependence of a maintenance mode control signal 424. The maintenance mode control signal 424 may be indicative of a duration of an on-state of the power switch 202 and/or the duration of an off-state of the power switch 202 during the maintenance mode.

Figure 5A:
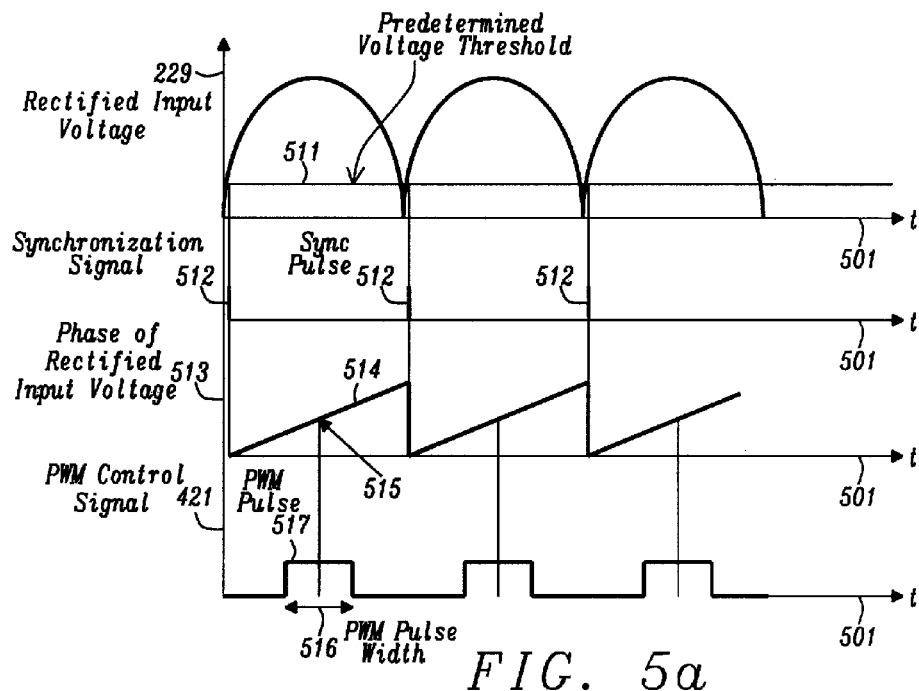
FIGS. 5a, 5b and 6 illustrate example signals for operating a driver signal.
Figure 5B:
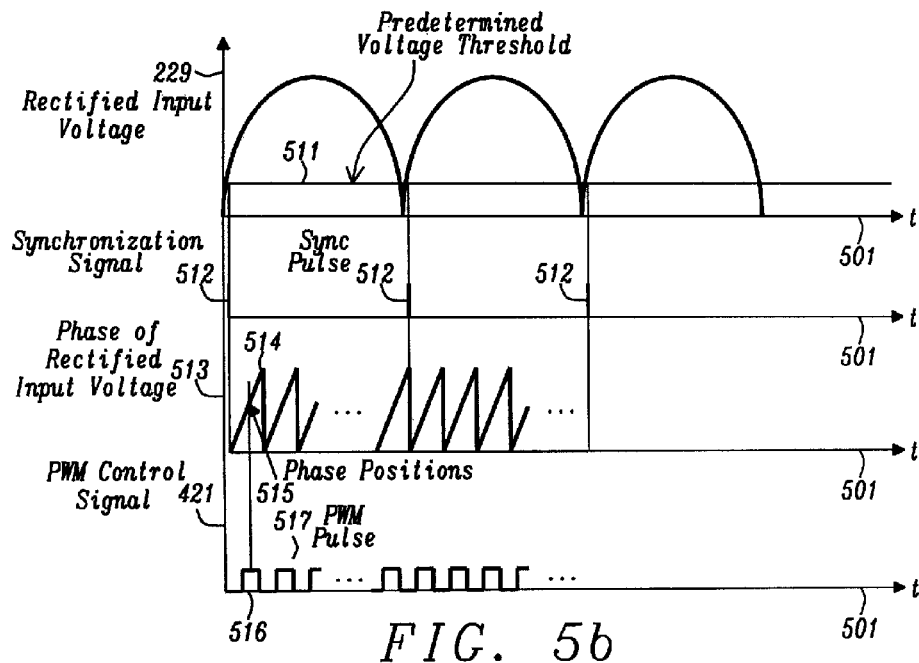

As such, the driver circuit 300 (in particular the controller 306) may be configured to operate the power converter 305 in a linear operation mode and/or in a maintenance mode, based on the PWM control signal 421. In other words, depending on the PWM control signal 421, the power switch 202 may be controlled in the linear operation mode or in the maintenance mode. As outlined above, in the linear dimming mode the SSL current 403 is typically controlled based on the peak current voltage 423. On the other hand, in the PWM dimming mode, the operation of the power converter 305 may be switched between the linear operation mode and the maintenance mode. The switching between the operation modes may be performed based on the PWM control signal 421, wherein the PWM control signal 421 may be derived from the mains frequency of the mains supply 330. In particular, a PWM frequency of the PWM control signal may be synchronized with the mains frequency. A duty cycle or pulse width of the PWM control signal may be dependent on the dim level. This is illustrated in FIGS. 5a and 5b.

In the PWM dimming mode, a duty cycle may define the PWM time window during which the PWM control signal 421 is at the first level (e.g. the high level) for operating the power converter 305 in the linear operation mode. The PWM frequency corresponds to the frequency at which PWM pulses occur, i.e. the frequency at which the power converter 305 is operated in the linear operation mode. The PWM frequency may be derived based on the half-wave and/or based on the full-wave mains frequency. In particular, the PWM frequency may correspond to a multiple of the half-wave and/or full-wave mains frequency, e.g. PWM frequency=100 Hz*N or PWM frequency=50 Hz*N, wherein N is a positive integer, N>0.

The controller 306 of the driver circuit 300 may be configured to determine a synchronization signal and/or synchronization pulses 512 based on the rectified input voltage 229. For this purpose, the rectified input voltage 229 may be compared to a pre-determined voltage threshold 511. A synchronization pulse 512 may be generated each time that the rectified input voltage 229 crosses the pre-determined voltage threshold 511 in one or more directions (from below the pre-determined voltage threshold 511 to above the pre-determined voltage threshold 511 and/or vice versa). This is illustrated in FIGS. 5a and 5b which illustrate the waveform of the rectified input voltage 229 along the time 501 and which illustrates a sequence of synchronization pulses 512 along the time 501.

A phase 513 of the rectified input voltage 229 may be determined using e.g. a counter with a pre-determined maximum counter value, wherein the counter may count from 0 up to the pre-determined maximum counter value between two successive synchronization pulses 512. As such, the curve 514 of counter values is indicative of the phase 513 of the rectified input voltage 229.

The PWM pulses 517 of the PWM control signal 421 may be placed at one or more particular phase values 515 of each full-wave or of each half-wave of the rectified input voltage 229. In the illustrated example of FIG. 5a, the PWM pulses 517 are centered at the medium phase 515 of each half-wave of the rectified input voltage 229. This is particularly beneficial, as the energy which is available at the input of the power converter 305 is maximized by doing this.

It should be noted that the PWM pulses 517 may be placed at different phases within a half-wave of the rectified input voltage 229. In particular, the PWM pulses 517 may be placed in dependence of the type of dimmer which is used to set the dim level. By way of example, the PWM pluses 517 may be centered within a half-wave of the rectified input voltage 229, in case a type of dimmer is used, which does not substantially affect the waveform of the rectified input voltage 229 (e.g. in case of a digital dimmer). The PWM pulses 517 may be placed within the second half (i.e. within the descending half) of a half-wave, in case a type of dimmer is used, which affects a first half of the half-wave of the rectified input voltage 229 (e.g. in case of a leading edge phase-cut dimmer). Furthermore, the PWM pulses 517 may be placed within the first half (i.e. within the ascending half) of a half-wave, in case a type of dimmer is used, which affects the second half of the half-wave of the rectified input voltage 229 (e.g. in case of a tailing edge phase-cut dimmer). As such, the controller 306 may be configured to detect the type of dimmer and place the PWM pulses 517 within a half-wave in dependence of the detected type of dimmer, to ensure that energy is available at the input of the power converter 305 for supplying the SSL device 309.

Each PWM pulse 517 may have a pulse width 516. The pulse width 516 typically depends on the dim level. In particular, the pulse width 516 may be reduced, if the dim level is reduced (and vice versa).

By placing the PWM pulses 517 at the same one or more phases 515 of the half-waves of a sequence of half-waves (or of the full-waves of a sequence of full-waves), it is ensured that the energy which is used for driving the SSL device 309 is constant within each half-wave or full-wave of the rectified input voltage 229. As a result of this, a visible flicker of the SSL device 309 may be avoided. Furthermore, the synchronization of the PWM pulses 517 with the rectified input voltage 229 allows the PWM frequency to be reduced.

As indicated above, the measurement of the half-wave mains period or the half-wave mains frequency (i.e. of the cycle frequency) may be derived from a single half- or full-wave period measurement of the mains supply 330. The determination of the half-wave synchronization pulses 512 based on a full-wave measurement may be beneficial in cases where the waveform of the mains supply 330 is asymmetric. In particular, the input voltage of the driver circuit 300 may comprise half-waves which are not completely symmetric. As a result of this, adjacent pulses 512 of a sequence of pulses 512 may not be at equidistance, if determined based on each half-wave of the rectified input voltage 229. This may cause corresponding phase errors or phase variations for the sequence of pulses 517 of the PWM control signal 421, which may lead to a visible flicker. On the other hand, the overall mains frequency of the mains supply 330 is typically stable. Hence, a sequence of equidistant synchronization pulses 512 may be determined based on a full-wave of the input voltage of the driver circuit 300.

As indicated above, the phase 513 is indicative of the phase of the rectified input voltage 229 or of the mains supply 330. In case of an 8 bit counter, the resolution for a 100 Hz half-wave is 0.7° (10 ms/256=39 us). In FIG. 5a, the phase 515 determines the center point of a PWM pulse 517 and/or the center point of the half-wave. The PWM time window 516 may be symmetric and may expand left and right starting from the center point 515. The PWM time window 516 (when the power converter 305 is operated in the linear operation mode) may be equal to t_on (pwm_ctrl=1)=dcyc*10 ms/256 for a 50 Hz mains frequency and for an 8 bit counter. In the off state (pwm_ctrl=0) of the PWM control signal 421, the power converter 305 is operated in the maintenance mode with fixed on/off times.

FIG. 5b illustrates a situation, where the PWM frequency is a multiple of the half-wave mains frequency (e.g. of the cycle frequency). In this case, each half-wave of the rectified input voltage 229 comprises a plurality of PWM pulses 517. The phase positions 515 of the plurality of PWM pulses 517 are maintained unchanged from one half-wave to the next, i.e. the plurality of PWM pulses 517 are synchronized with the half-wave or full-wave of the input voltage of the driver circuit 300.

Figure 6:
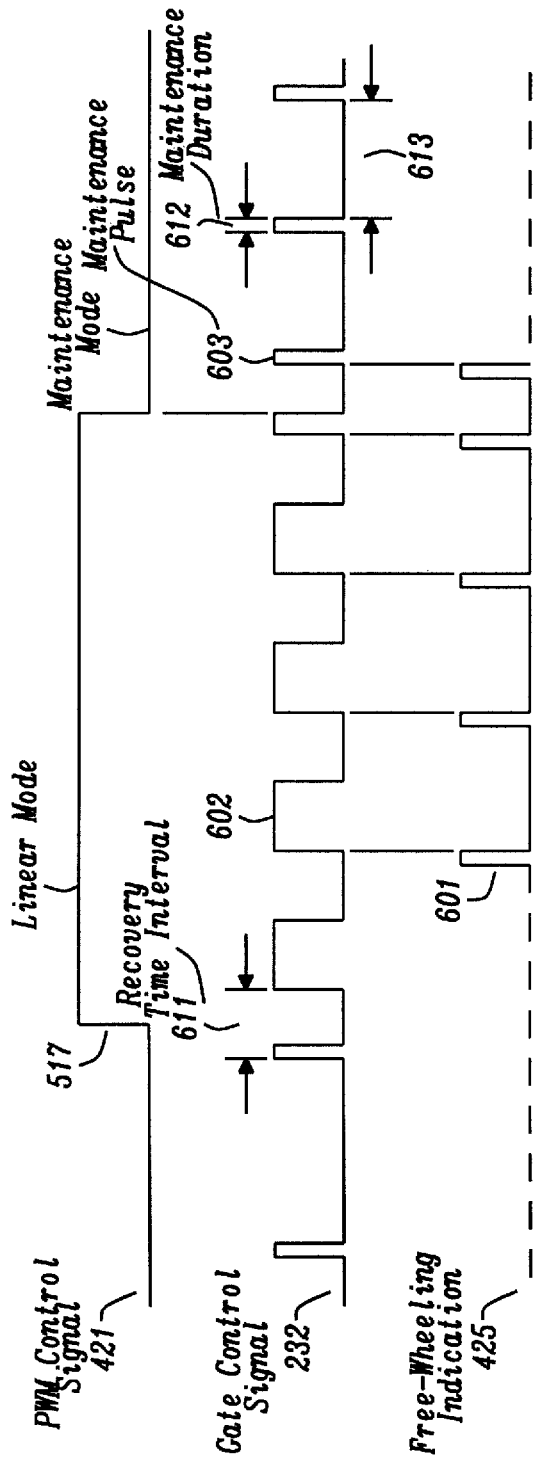

FIG. 6 illustrates the transition from the maintenance mode to the linear operation mode and vice versa. As indicated above, the PWM control signal 421 indicates the operation mode of the power converter 305. During the maintenance mode, the gate control signal 232 may comprise maintenance pulses 603 which have an on-duration 612 which is sufficient for providing energy to the controller 306, but not sufficient for causing the SSL device 309 to emit visible light. In particular, during the maintenance mode, the gate control signal 232 may comprise a sequence of such maintenance pulses 603 which are separated by a fixed off-duration 613. On the other hand, during the linear operation mode, the duration of the on-pulses 602 may be controlled or regulated based on the peak current voltage 423 and based on the freewheeling indication 425. FIG. 6 illustrates a sequence of peaks 601 of the freewheeling indication 425 which signal freewheeling.

The controller 306 may be configured to ensure that the first on-pulse 602 upon entry into the linear operation mode is generated at a pre-determined recovery time interval 611 subsequent to the last maintenance pulse 603. This may be beneficial in order to ensure that the linear operation mode is initiated with the power converter 305 (notably with the inductor 307 of the power converter 305) being in a defined state. The recovery time interval 611 may be sufficiently long to ensure that the inductor 307 of the power converter 305 is substantially energy free subsequent to a maintenance pulse 603.

On the other hand, the transition of the PWM control signal 521 from the first level to the second level may cause the power converter 305 to terminate the linear operation mode immediately. The maintenance mode may be started subsequent to the detection of freewheeling (based on the freewheeling indication 425). In other words, the first maintenance pulse 603 subsequent to entry into the maintenance mode may be generated upon detection of freewheeling. By doing this, it can be ensured that the illumination of the SSL device 309 is terminated at a fixed time instant within each half-wave of the rectified input voltage 229. Furthermore, a reliable power supply of the controller 306 can be ensured.

Figure 7:
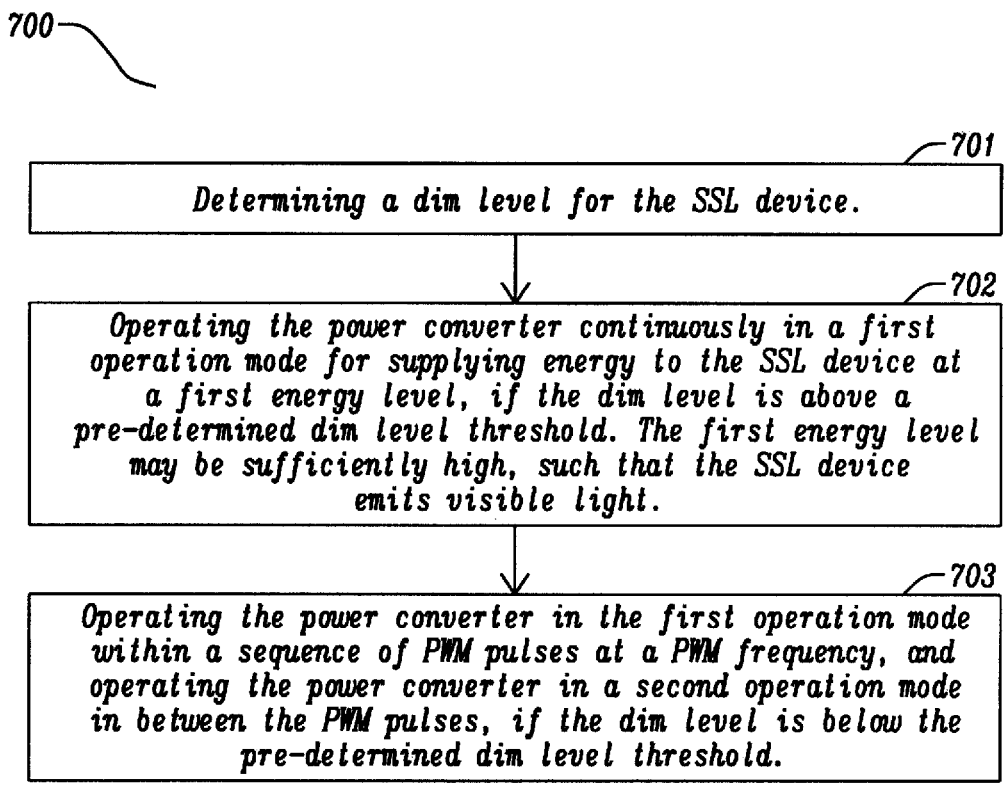
FIG. 7 shows a flow chart of an example method for operating a SSL device in a flicker-free manner.

FIG. 7 shows a flow chart of an example method 700 for operating an SSL device 309 using a driver circuit 300. The driver circuit 300 comprises a power converter 305 configured to transfer energy from an input of the driver circuit 300 to the SSL device 309. The driver circuit 300 is configured to derive the energy at the input from an AC mains voltage at a mains frequency. The method 700 comprises determining 701 a dim level for the SSL device 309. Furthermore, the method 700 may comprise operating 702 the power converter 305 continuously in a first operation mode (e.g. in the linear operation mode) for supplying energy to the SSL device 309 at a first energy level, if the dim level is above a pre-determined dim level threshold. The first energy level may be sufficiently high, such that the SSL device 309 emits visible light. As such, the method 700 may comprise performing 702 analog or linear dimming, if the dim level is above the pre-determined dim level threshold.

Furthermore, the method comprises operating 703 the power converter 305 in the first operation mode within a sequence of PWM pulses 517 at a PWM frequency, and operating the power converter 305 in a second operation mode (e.g. in the maintenance mode) in between the PWM pulses 517, if the dim level is below the pre-determined dim level threshold. In the second operation mode, the power converter 305 is operated for supplying energy to the SSL device 309 at a second energy level, which is lower than the first energy level. The second energy level may be such that the SSL device 309 does not emit visible light. As such, the method 700 comprises performing 703 PWM dimming, if the dim level is above the predetermined dim level threshold. The sequence of PWM pulses 517 which is used for PWM dimming is synchronized with the AC mains voltage. As a result of this, flicker of the SSL device 309 may be avoided.

In the present document, a driver circuit for an SSL device and a corresponding method have been described, which allow a flicker-free operation of the SSL device, even at relatively low dim levels.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller for a driver circuit of a solid state lighting, referred to as SSL, device, wherein the driver circuit comprises a power converter configured to transfer energy from an input of the driver circuit to the SSL device; wherein the energy at the input is derived from an AC mains voltage at a mains frequency; wherein the controller is configured to
   determine a dim level for the SSL device;
   if the dim level is above a pre-determined dim level threshold, operate the power converter continuously in a first operation mode for supplying energy to the SSL device at a first energy level; and
   if the dim level is below the pre-determined dim level threshold, operate the power converter in the first operation mode at a time duration of PWM pulses, and operate the power converter in a second operation mode at a time duration in-between the PWM pulses; wherein in the second operation mode the power converter is operated for supplying energy to the SSL device at a second energy level; wherein the second energy level is lower than the first energy level; and wherein the PWM pulses are synchronized with the AC mains voltage.

2. The controller of claim 1, wherein the controller is configured to
   determine a sequence of synchronization pulses based on a rectified AC mains voltage; and
   determine a sequence of PWM pulses based on the sequence of synchronization pulses.

3. The controller of claim 1, wherein the controller is configured to
   determine a type of dimmer that is used to set the dim level; and
   synchronize the PWM pulses with the AC mains voltage, in dependence of the determined type of dimmer.

4. The controller of claim 1, wherein a width of the PWM pulses depends on the dim level.

5. The controller of claim 1, wherein the PWM pulses are repeated at a PWM frequency and wherein the PWM frequency is greater than a perceptual frequency of light intensity variations perceivable by a human eye.

6. The controller of claim 1, wherein
   the AC mains voltage exhibits a waveform comprising a sequence of full-waves;
   a phase of a full-wave is associated with an amplitude of the full-wave; and
   the controller is configured to determine a sequence of PWM pulses such that the PWM pulses coincide with the same one or more phases of each full-wave of the sequence of full-waves.

7. The controller of claim 6, wherein
   a full-wave comprises two half-waves; and
   the sequence of PWM pulses comprises an integer number of PWM pulses per half-wave.

8. The controller of claim 7, wherein the integer number of PWM pulses is centered at a zenith of the half-wave.

9. The controller of claim 6, wherein the controller is configured to
   determine a single synchronization pulse per full-wave; and
   determine at least one PWM pulse per half-wave.

10. The controller of claim 1, wherein the power converter comprises
an inductor configured to store energy from the input of the driver circuit and release the stored energy towards the SSL device; and
a power switch which is arranged in series with the inductor and which is configured to enable an inductor current through the inductor, when in on-state.

11. The controller of claim 10; wherein for operating the power converter in the first operation mode, the controller is configured to repeatedly
put the power switch to on-state, subject to detecting freewheeling of the inductor; and
put the power switch to off-state, subject to detecting that the inductor current has reached a pre-determined peak current; wherein the pre-determined peak current is dependent on the dim level.

12. The controller of claim 10, wherein for operating the power converter in the second operation mode, the controller is configured to periodically
put the power switch to on-state for a pre-determined on-duration; and
put the power switch to off-state for a pre-determined off-duration; wherein the on-duration and the off-duration are such that the transferred energy at the second energy level is sufficient for maintaining the controller in operation.

13. The controller of claim 12, wherein the controller is configured to
put the power switch to off-state, upon entry into the second operation mode; and
maintain the power switch in off-state, until freewheeling of the inductor is detected.

14. The controller of claim 12, wherein the controller is configured to
put the power switch to or maintain the power switch in off-state, upon entry into the first operation mode; and
maintain the power switch in off-state for at least a pre-determined recovery duration starting from a last on-state period of the power switch.

15. A method for operating a solid state lighting, referred to as SSL, device using a driver circuit, wherein the driver circuit comprises a power converter to transfer energy from an input of the driver circuit to the SSL device; wherein the energy at the input is derived from an AC mains voltage at a mains frequency; wherein the method comprises
determining a dim level for the SSL device;
if the dim level is above a pre-determined dim level threshold, operating the power converter continuously in a first operation mode for supplying energy to the SSL device at a first energy level; and
if the dim level is below the pre-determined dim level threshold, operating the power converter in the first operation mode at a time duration of PWM pulses, and operating the power converter in a second operation mode at a time duration in-between the PWM pulses; wherein in the second operation mode the power converter is operated for supplying energy to the SSL device at a second energy level; wherein the second energy level is lower than the first energy level; and wherein the PWM pulses are synchronized with the AC mains voltage.

16. The method for operating a solid state lighting, SSL, device using a driver circuit of claim 15, wherein the controller is
determining a sequence of synchronization pulses based on a rectified AC mains voltage; and
determining a sequence of PWM pulses based on the sequence of synchronization pulses.

17. The method for operating a solid state lighting, SSL, device using a driver circuit of claim 15, wherein the controller is
determining a type of dimmer that is used to set the dim level; and
synchronizing the PWM pulses with the AC mains voltage, in dependence of the determined type of dimmer.

18. The method for operating a solid state lighting, SSL, device using a driver circuit of claim 15, wherein a width of the PWM pulses depends on the dim level.

19. The method for operating a solid state lighting, SSL, device using a driver circuit of claim 15, wherein the PWM pulses are repeated at a PWM frequency
and wherein the PWM frequency is greater than a perceptual frequency of light intensity variations perceivable by a human eye.

20. The method for operating a solid state lighting, SSL, device using a driver circuit of claim 15, wherein
the AC mains voltage exhibits a waveform comprising a sequence of full-waves;
a phase of a full-wave is associated with an amplitude of the full-wave; and
the controller determines a sequence of PWM pulses such that the PWM pulses coincide with the same one or more phases of each full-wave of the sequence of full-waves.

21. The method for operating a solid state lighting, SSL, device using a driver circuit of claim 20, wherein
a full-wave comprises two half-waves; and
the sequence of PWM pulses comprises an integer number of PWM pulses per half-wave.

22. The method for operating a solid state lighting, SSL, device using a driver circuit of claim 21, wherein the integer number of PWM pulses is centered at a zenith of the half-wave.

23. The method for operating a solid state lighting, SSL, device using a driver circuit of claim 20, wherein the controller is
determining a single synchronization pulse per full-wave; and
determining at least one PWM pulse per half-wave.

24. The method for operating a solid state lighting, SSL, device using a driver circuit of claim 15, wherein the power converter is
storing energy in an inductor from the input of the driver circuit and releasing the stored energy towards the SSL device; and
providing a power switch which is arranged in series with the inductor and which enables an inductor current through the inductor, when in on-state.

25. The method for operating a solid state lighting, SSL, device using a driver circuit of claim 24, wherein for operating the power converter in the first operation mode, the controller is repeatedly
putting the power switch to on-state, subject to detecting freewheeling of the inductor; and
putting the power switch to off-state, subject to detecting that the inductor current has reached a pre-determined peak current; wherein the pre-determined peak current is dependent on the dim level.

26. The method for operating a solid state lighting, SSL, device using a driver circuit of claim 24, wherein for operating the power converter in the second operation mode, the controller is periodically
putting the power switch to on-state for a pre-determined on-duration; and putting the power switch to off-state for a pre-determined off-duration; wherein the on-duration and the off-duration are such that the transferred energy at the second energy level is sufficient for maintaining the controller in operation.

27. The method for operating a solid state lighting, SSL, device using a driver circuit of claim 26, wherein the controller is putting the power switch to off-state, upon entry into the second operation mode; and maintaining the power switch in off-state, until freewheeling of the inductor is detected.

28. The method for operating a solid state lighting, SSL, device using a driver circuit of claim 26, wherein the controller is putting the power switch to or maintain the power switch in off-state, upon entry into the first operation mode; and maintaining the power switch in off-state for at least a pre-determined recovery duration starting from a last on-state period of the power switch.

* * * * *